(12) United States Patent
Hottinen (10) Patent No.: US 8,315,220 B2
(45) Date of Patent: Nov. 20, 2012

(54) CHANNEL ACCESS FOR COGNITIVE NETWORKS

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 361 days.

(21) Appl. No.: 12/759,199

(22) Filed: Apr. 13, 2010

(65) Prior Publication Data

US 2011/0249573 A1 Oct. 13, 2011

(51) Int. Cl.
*H04W 4/00* (2009.01)
(52) U.S. Cl. .................. 370/329; 370/437; 370/431
(58) Field of Classification Search .......... 370/329–330, 370/431–437
See application file for complete search history.

(56) References Cited

U.S. PATENT DOCUMENTS

| | | | |
|---|---|---|---|
| 7,466,981 B1 * | 12/2008 | Abdelhamid et al. | 455/438 |
| 7,574,224 B2 * | 8/2009 | Lane et al. | 455/502 |
| 2009/0268674 A1 | 10/2009 | Liu et al. | |
| 2010/0157835 A1 * | 6/2010 | Zhang et al. | 370/252 |
| 2010/0165910 A1 * | 7/2010 | Mathews et al. | 370/315 |

FOREIGN PATENT DOCUMENTS

| | | |
|---|---|---|
| WO | 2007/043827 A1 | 4/2007 |
| WO | 2007/082036 A1 | 7/2007 |
| WO | 2009/012056 A1 | 10/2009 |
| WO | 2009/122697 A1 | 10/2009 |

OTHER PUBLICATIONS

Extended European Search Report for European Application No. 11155725.2-2412 dated Jun. 9, 2011, 7 pages.

* cited by examiner

*Primary Examiner* — Phuc Tran
(74) *Attorney, Agent, or Firm* — Locke Lord LLP

(57) ABSTRACT

A system for managing wireless interaction based on communication performance. Source apparatuses may desire to establish wireless links to target apparatuses. Prior to initiating new wireless links, source apparatuses may evaluate whether the establishment of new wireless links will increase the cumulative performance of the wireless communication environment, wherein the wireless communication environment may comprise the apparatuses communicating wirelessly within transmission range of a source apparatus. The evaluation may determine, for example, whether predicted cumulative performance of the wireless communication environment after the new wireless link is initiated would be greater than cumulative performance prior to link initiation.

21 Claims, 9 Drawing Sheets

CHANNEL ACCESS FOR COGNITIVE NETWORKS

BACKGROUND

1. Field of Invention

The present invention relates to wireless communication, and in particular, to managing wireless communication between apparatuses based on computed link performance.

2. Background

The proliferation of wireless communication functionality in various apparatuses has spawned advantages to users that have, in turn, revealed obstacles to implementation. For example, many users now enjoy the ability to perform tasks that were previously not achievable. These tasks were previously unachievable not only because apparatuses did not have the ability to communicate via wireless communication, but also because wireless communication protocols could not provide the capacity, security, quality of service (QoS) demanded by users. It has now become almost assumed that all wireless apparatuses, regardless of operational limitations, that are able to communicate via one or more wireless communication mediums deliver performance equivalent to the wired operation of possibly much more robust machinery.

In this pursuit, manufacturers often attempt to leverage a multitude of different wireless transports within the same apparatus. For example, mobile communication devices may operate under strict space, power and processing limitations. To circumvent these limitations, various wireless transports may be supported in the same apparatus to perform specialized tasks. While long-range transports (e.g., cellular) may be utilized for most communication activities, the use of these transports may cost more due to operating in regulated bandwidth, may utilize more power regardless of the task, and may not be appropriate for some environments like the inside of a structure. Thus, short-range transports may be also employed in the same apparatus. Most short-range transports operate in unregulated bandwidth, which is cheaper to implement. Further, each short-range transport may have characteristics (low power, low capacity, security, low hardware overhead) that makes some transports more appropriate for particular activities.

However, the expansion of short-range communication operation in unregulated bandwidth has resulted in interference problems. More specifically, apparatuses operating in unregulated bandwidth already have to deal with environmental "noise" (interference) emanating from other wireless communication transmitters and non-communication-related signal sources (e.g., fields from electronic and electromechanical devices). The noise is then made worse by an exponentially expanding category of wireless-enabled apparatuses operating in this bandwidth. In such difficult conditions the benefits of operating using short-range wireless transports may be greatly reduced if resources must be consumed due to retransmission. Such situations negatively impact the overall QoS that an apparatus can provide, resulting in negative user experience.

SUMMARY

Various example embodiments of the present invention may be directed to the management of wireless interaction based on communication performance. Communication performance may be measured, for example, in terms of quality, utility, etc. Source apparatuses may desire to establish wireless links to target apparatuses. Prior to initiating new wireless links, source apparatuses may evaluate whether the establishment of new wireless links will increase the cumulative performance of the wireless communication environment, wherein the wireless communication environment may comprise the apparatuses communicating wirelessly within transmission range of a source apparatus. The evaluation may determine, for example, whether predicted cumulative performance of the wireless communication environment after the new wireless link is initiated would be greater than cumulative performance prior to link initiation.

In at least one example implementation, source apparatuses may initially transmit wireless probe signals. Probe signals may be embedded in established transmission slots, may employ predetermined modulation and coding schemes and may comprise predetermined symbol sequences, waveforms, encoding schemes (or other similar characteristics) that enable receiving apparatuses to determine channel characteristics via methods such as channel estimation, signal-to-noise-ratio estimation, capacity estimation, power estimation, etc. Apparatuses that receive probe signals from the source apparatus may transmit a response message comprising at least local signal information related to the received probe signals. Source apparatuses may receive the response signals and utilize the signal information in the response signals to compute a current cumulative performance measure for the communication environment and a performance measure for the communication environment taking into account the predicted impact of one or more new wireless links. Then, in accordance with at least one embodiment of the present invention, the source may initiate the new link if the predicted cumulative performance measure after the link is initiated is greater than the cumulative performance measure prior to the link being initiated. Cumulative performance measures may also, in some instances, include fairness parameters so that sources in disadvantageous channels can eventually access these channels.

Cumulative performance measures may be computed in a source apparatus, or the computing may be shared between the source apparatus and information-providing apparatuses. For example, cumulative performance measures that are specific to a receiving apparatus, such as current total throughput or capacity, may initially be computed in the specific receiving apparatus before being forwarded via a multicast/broadcast channel for additional processing in the source apparatus. These apparatus-specific cumulative performance measures may be comprised of one or more performance components describing the interrelationship of new links, existing links to target apparatuses and existing links between other apparatuses.

For instance, responding apparatuses may be identified as target apparatuses (e.g., apparatuses with which links are proposed) or "other" apparatuses. A performance component may then describe predicted performance for the new link accounting for interference that may be caused, or experienced, by existing links to target apparatuses. Another apparatus-specific performance component may describe the cumulative performance for links of other apparatuses at different receiving apparatuses taking into account interference caused by the proposed new wireless link. The example predicted performance components may then be provided to the source apparatus where they may be combined, and the combined measure may be compared to existing wireless link performance in the environment. Existing wireless link performance measures may comprise, for example, performance components that relate to the performance of existing links to target apparatuses taking into account interference that may be caused by existing wireless links between other apparatuses, the performance of the existing wireless links to other apparatuses etc. The various predicted and existing performance measures may then be used (e.g., compared) in order to decide whether or not to initiate the proposed new wireless link on the current channel, or possibly whether to consider evaluating other channels for initiating the new wireless link (e.g., a wireless channel that might currently be experiencing less traffic).

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which.

DESCRIPTION OF EXAMPLE EMBODIMENTS

While the invention has been described below in terms of a multitude of example embodiments, various changes can be made therein without departing from the spirit and scope of the invention, as described in the appended claims.

I. Example System with which Embodiments of the Present Invention may be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Figure 1:
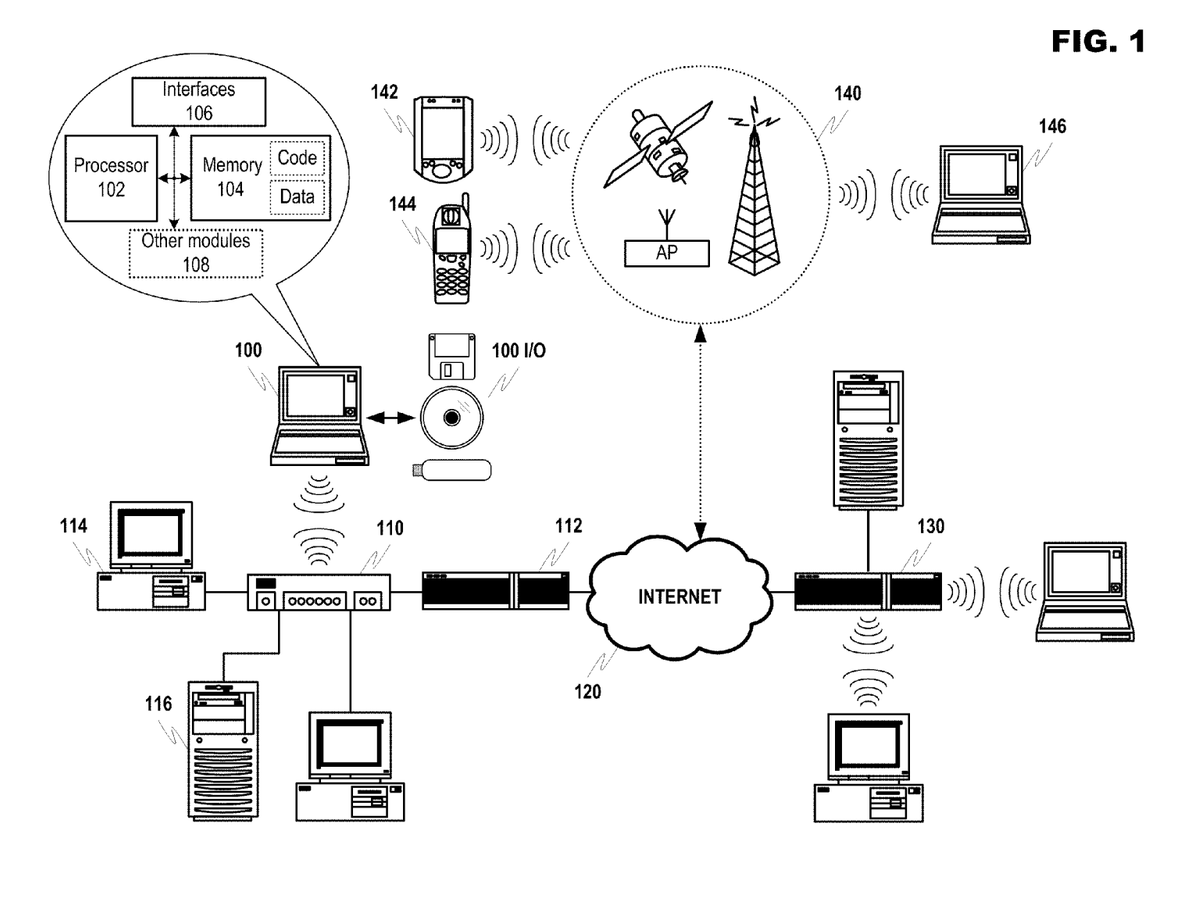
FIG. 1 discloses example apparatuses, communication configuration and network architecture usable in implementing at least one embodiment of the present invention.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication.

Figure 2:
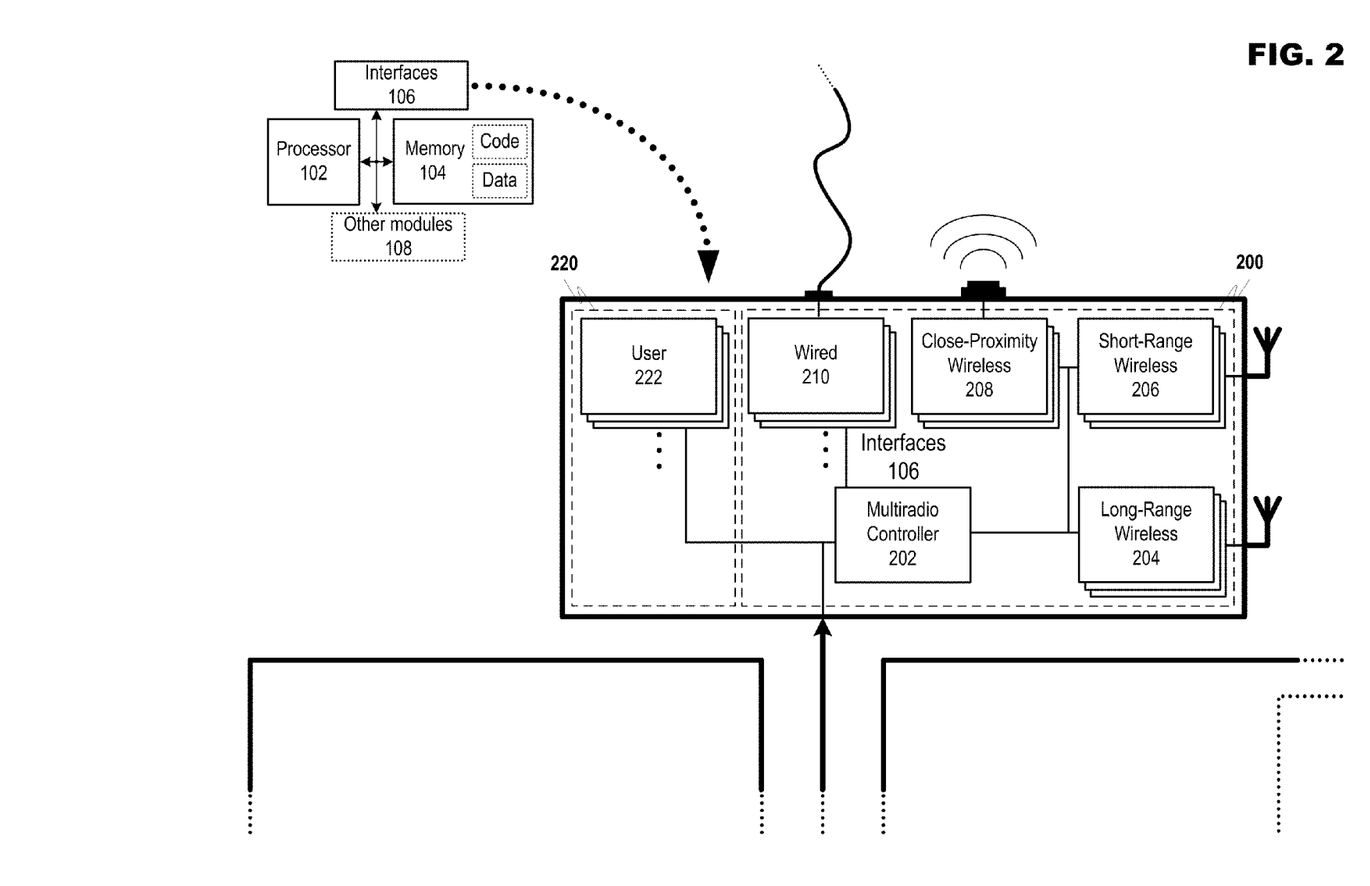
FIG. 2 discloses additional detail with respect to example communication interfaces that may be usable with various embodiments of the present invention.

Further detail regarding example interface component 106, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

II. Example Operational Environment

Figure 3:
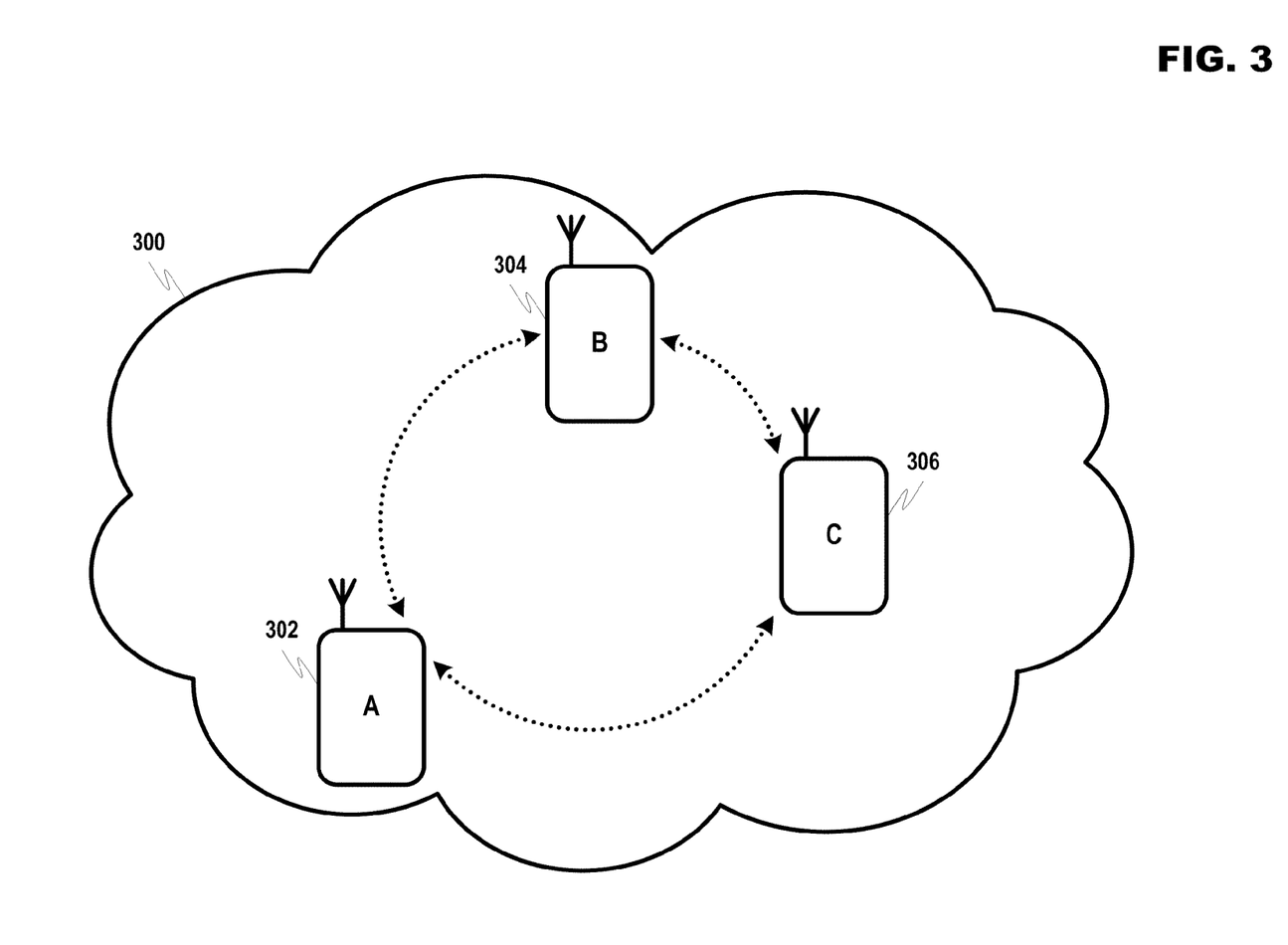
FIG. 3 discloses an example of an operational environment in which at least one embodiment of the present invention may be implemented.

FIG. 3 discloses an example environment that will be utilized for explaining the various embodiments of the present invention. Environment 300 may be defined by a physical area (e.g., a room, a building, a transmission range, etc.) and/or a spectrum of frequencies in a bandwidth in which apparatuses are permitted to operate (e.g., unregulated bandwidth). For example, there are three apparatuses in environment 300 as shown in FIG. 3. Apparatus A 302, apparatus B 304 and apparatus C 306 may interact by forming an ad hoc (e.g., improvised or impromptu) wireless network between themselves. However, the actual manner in which the wireless network is formed may depend on any of apparatuses 302-306, on environment 300, etc.

One or more of apparatuses disclosed in FIG. 3 may have information to transmit via wireless communication that may be desired (or required) by the other apparatuses. In such instances these apparatuses may be deemed a source of the information that is to be transmitted. Source apparatuses may broadcast probe messages, also called advertisement messages, to other apparatuses in the area that may be interested in the information. The advertising apparatus may have particular recipient apparatuses identified (e.g., targets) for the information. Target devices may be specific apparatuses based on a device identifier, may be a category or class of devices, may be targeted to one or more users associated with an apparatus, etc. Devices that receive an advertisement message may transmit a response message accepting the invitation to transmit the information. The response message may also include connection information that, for example, assists the source establish a wireless link to target apparatuses for conveying the information.

Ideally, the conveyance of information from a source apparatus to one or more target apparatuses may be executed in a manner such as discussed above with respect to FIG. 3. For example, a source apparatus may advertise information, a target apparatus may respond to the advertisement, and the source apparatus may proceed to initiate a link to the target apparatus in order to wirelessly transmit the information. However, real world operating environments are not so straight forward. For example, FIG. 4 discloses an operational scenario that accounts for signal activity, aside from the proposed interaction, that may also exist in environment 300.

Figure 4:
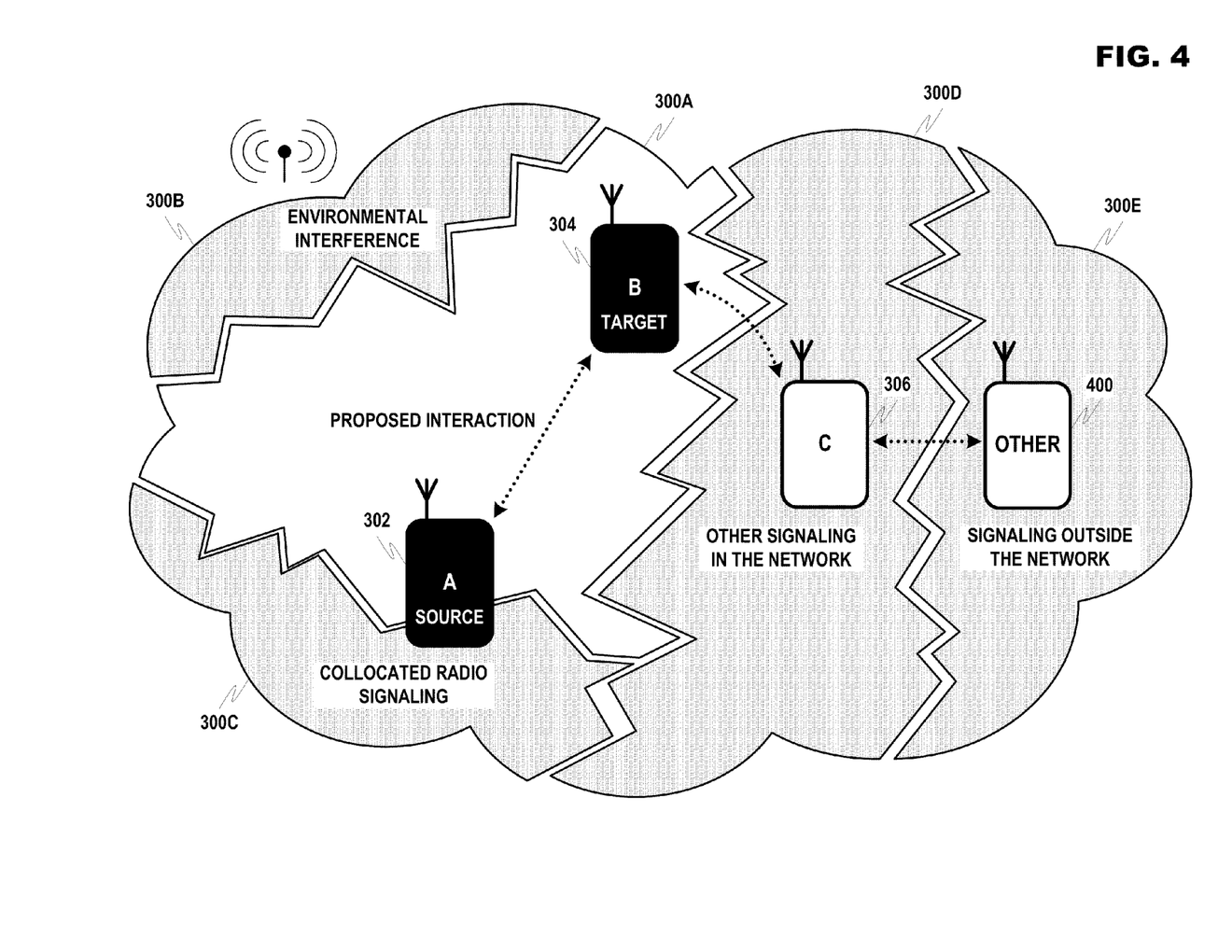
FIG. 4 discloses further detail regarding example sources of interference in the example operational environment that was initially disclosed in FIG. 3.

An example of a proposed source-to-target interaction between apparatus A 302 and apparatus B 304 is disclosed at 300A in FIG. 4. However, various instances where this wireless interaction may be adversely affected by, or may in turn adversely affect, other activities that are also occurring in environment 300 will now be described with respect to 300A-E. For example, some signals may be considered to be pure noise or interference from the perspective of any electronic wireless communication occurring in environment 300. Environmental interference 300B may comprise electrically or electromechanically-generated fields that cause interference with signals operating in the same or nearby bandwidth. Such interference may be generated by large motors, electrical power equipment such as transformers, microwave ovens, etc. These sources may become extremely problematic when the signals they generate fall very close to the bandwidth being utilized by apparatuses communicating wirelessly in environment 300.

In addition, the example interaction disclosed at 300A may also affect, or may be affected by, other communication signals in environment 300. Initially, other radios collocated in source apparatus A 302 may be active at the same time. An example of such communication activity is shown at 300 C. Allowing multiple collocated radios to be active in apparatus A 302 may enhance wireless communication flexibility. However, it is also possible that the concurrent operation of certain wireless transports in such close proximity may cause interference. In an effort to avoid interference, some apparatuses may contain some cognitive features that allow for the management of active communication. However, this logic is primarily limited to managing operation based on conditions existing within the apparatus, not on a environmental scale. In a similar manner, target apparatus B 304 may also be able to maintain multiple simultaneous wireless communication links as disclosed at 300D. Interference in such a situation depends upon perspective. For example, initiating the proposed link at 300A may be deemed beneficial to apparatus B 304 while possibly causing interference with the existing link between apparatus B 304 and apparatus C 306. However, these existing links may also interfere with performance of the proposed interaction from the perspective of source apparatus A 302. Existing wireless links between apparatuses that are not involved in the proposed interaction shown at 300A may also exist in environment 300. A example wireless link existing between apparatus C 306 and "other" apparatus 400 is disclosed at 300E. Initiating a wireless link to support the proposed interaction, as shown at 300A, will simply be seen the occurrence of a new interference signal to the "other" apparatuses (non-target apparatuses) already engaged in the link shown at 300E.

III. Example Environmental Analysis

FIG. 4 demonstrates that environment 300 may be fraught with "obstacles" to overcome when attempting to perform a wireless transaction. On the other hand, any existing communications in environment 300 may perceive the initiation of the proposed wireless link to be interference detrimental to the QoS that may be delivered over the existing wireless links. In view of these opposing viewpoints, determining whether to initiate a new wireless link or not may be problematic when trying to make the determination at the environmental level.

In accordance with at least one embodiment of the present invention, a cumulative measurement of wireless communication performance in environment 300, before initiation of a proposed wireless link, may be compared to a cumulative performance measurement of wireless communication performance in environment 300 that takes into account a predicted impact of the initiation of the proposed wireless link. Cumulative performance measures may be computed in order to, for example, determine whether initiation of the proposed wireless link will improve the cumulative performance of wireless communication in environment 300. For example, if the cumulative performance of communication in environment 300 after the proposed wireless link is initiated is predicted to be greater than the current cumulative performance, then initiation of the wireless link may proceed. Otherwise, initiation of the link may be delayed or canceled.

Figure 5:
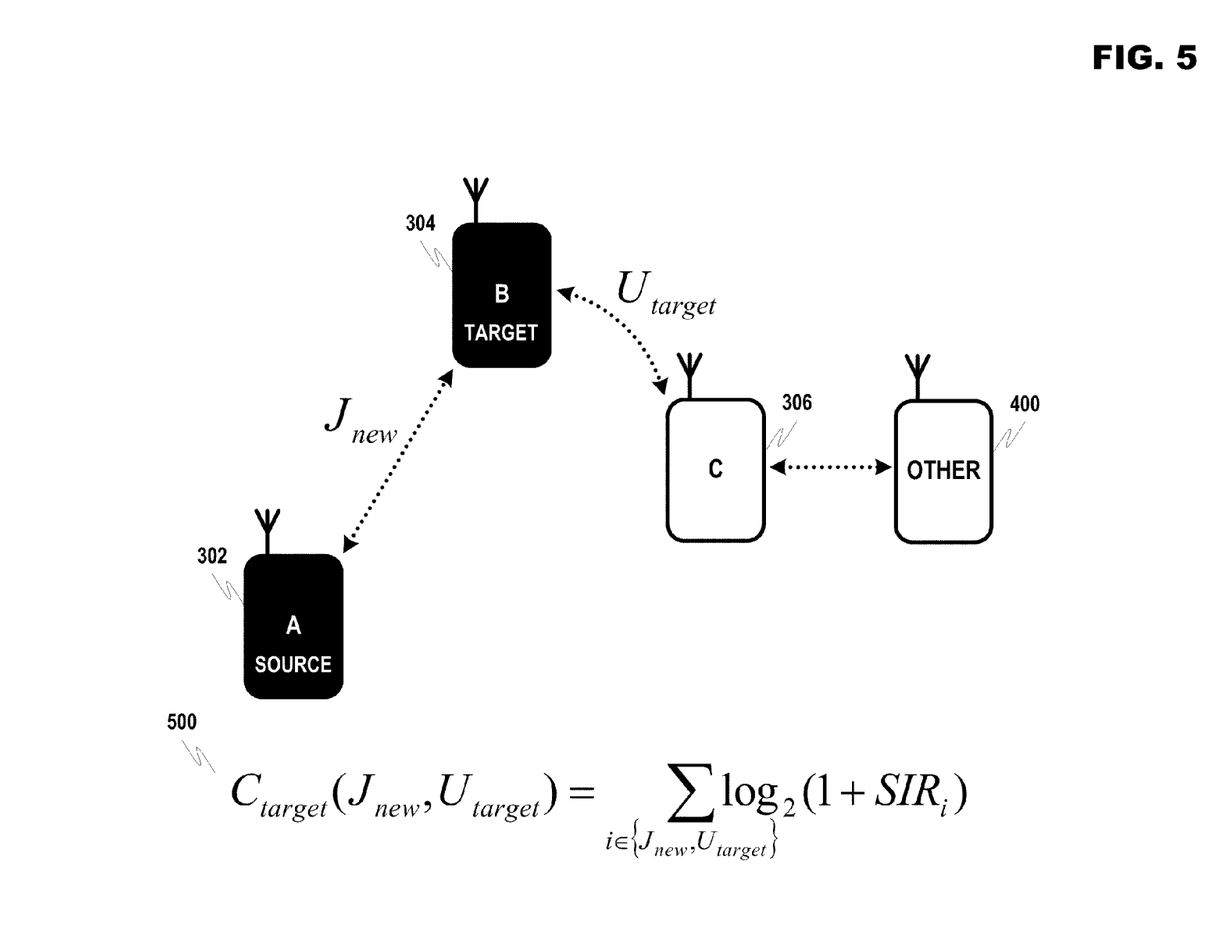
FIG. 5 discloses an example performance component in accordance with at least one embodiment of the present invention.
Figure 6:
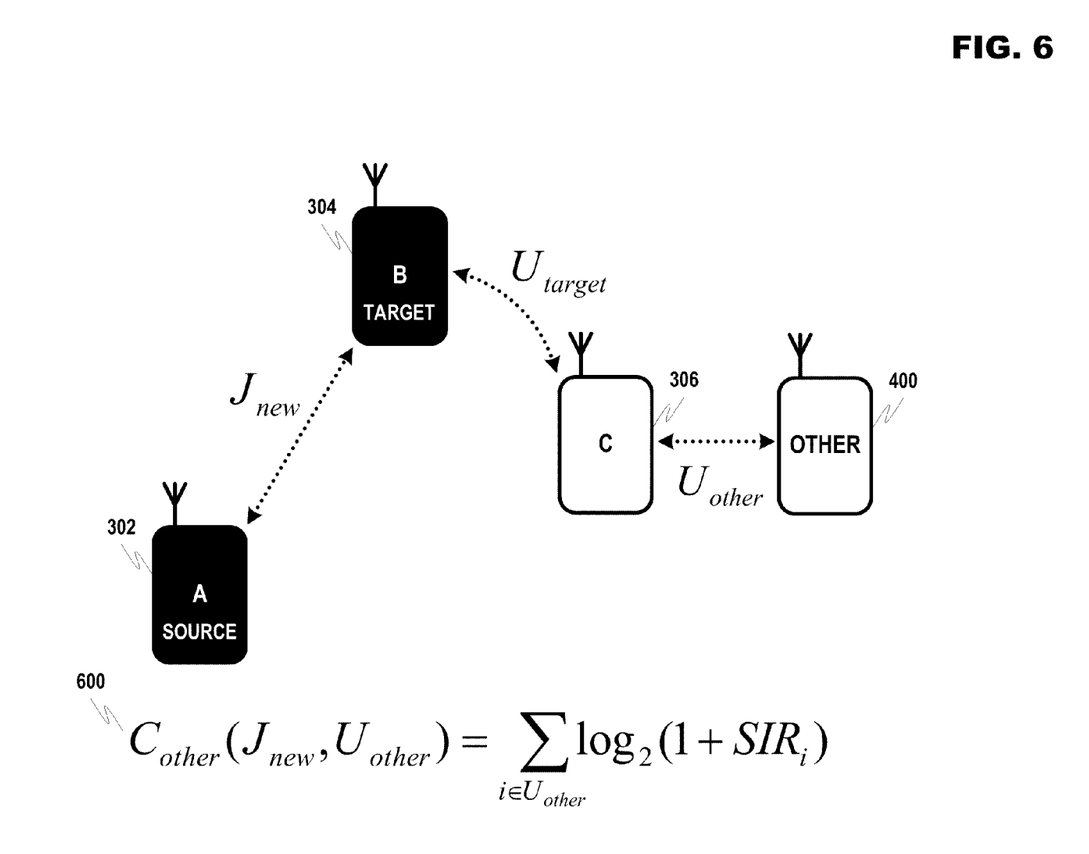
FIG. 6 discloses another example performance component in accordance with at least one embodiment of the present invention.
Figure 7:
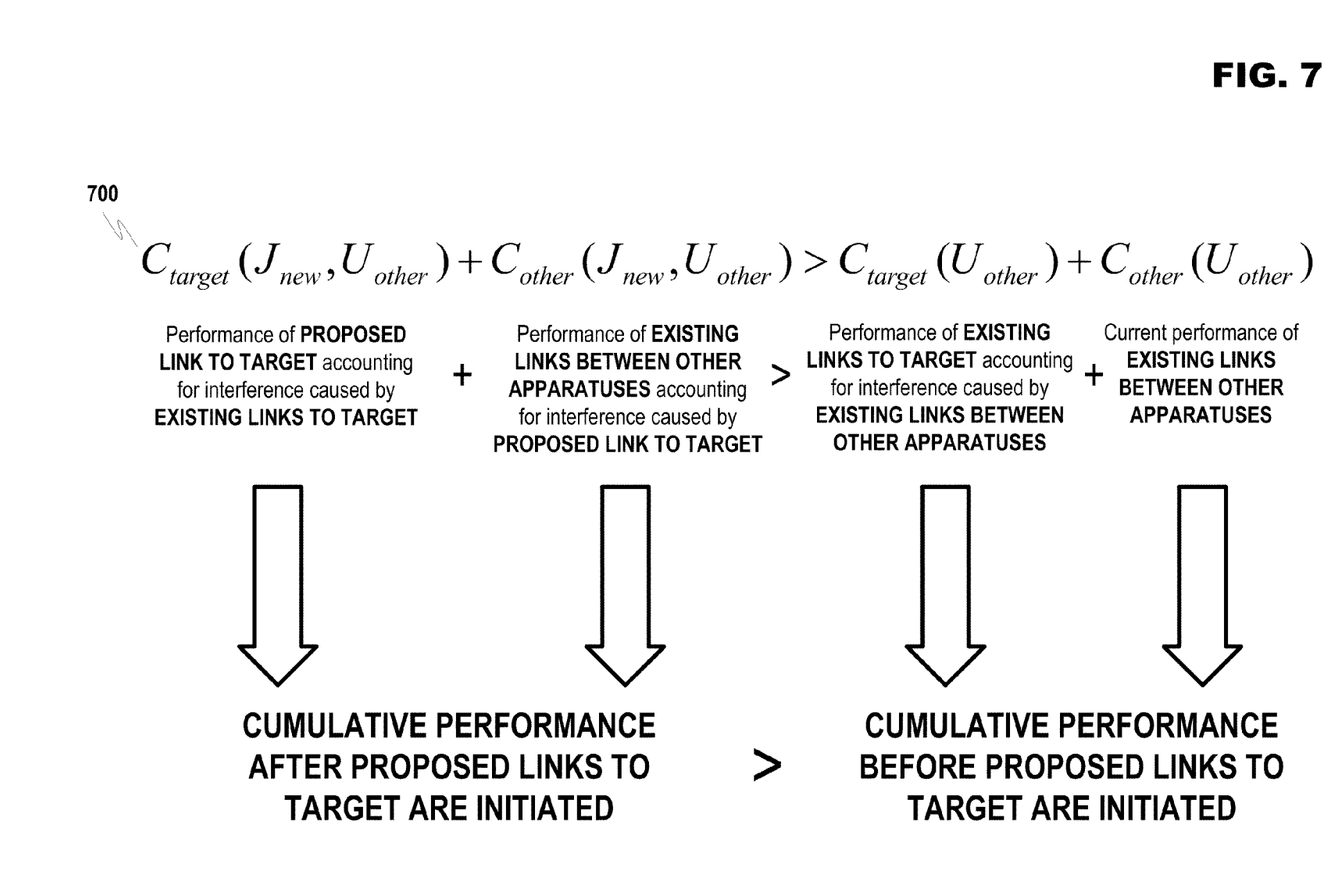
FIG. 7 discloses an example comparison of performance measures in accordance with at least one embodiment of the present invention.

FIG. 5-7 disclose example mathematical relationships that describe how various existing and proposed wireless links within environment 300 may be considered when computing cumulative performance measures in accordance with at least one embodiment of the present invention. For the sake of explanation in the present disclosure, these relationships will be termed cumulative performance components. In accordance with at least one embodiment of the present invention, various cumulative performance components may be computed based on activities occurring in environment 300, and these computed performance components may then be combined to summarize the effect that various activities have on the cumulative performance measure for wireless communication occurring in environment 300.

A first example cumulative performance component is disclosed in FIG. 5. A mathematic relationship describing the cumulative performance component is disclosed at 500:

$$C_{target}(J_{new}, U_{target}) = \sum_{i \in \{J_{new}, U_{target}\}} \log_2(1 + SIR_i)$$

In equation 500, the cumulative performance $C_{target}$ of the proposed link $J_{new}$ between source apparatus A 302 and target apparatus B 304 is computed in view of the effect of wireless links $U_{target}$ already existing between target apparatus B 304 and other apparatuses such as other apparatus C 306. In this instance, the cumulative performance $C_{target}$ is equal to the summation of binary logarithm of 1+ the Signal-to-Interference Ratio (SIR) for each of the proposed wireless links to be initiated and each of the existing links to the target apparatus (e.g., target apparatus B 304). In equating these two relationships, this equation attempts to capture the effects that may be experienced upon initiation of a new wireless link to apparatus B 304 given the fact that this apparatus may already be engaged in active wireless communication. The existing wireless links may be deemed as noise or interference to the new wireless link, while the converse may also be true in that the existing wireless links may experience a negative impact to QoS due to interference that may be caused by the newly initiated wireless link. However, this relationship describes only one component of what may occur after a new wireless link initiates.

FIG. 6 discloses another performance component that may be considered when determining whether to initiate a new link into environment 300 in accordance with at least one embodiment of the present invention. Cumulative performance $C_{other}$ describes the performance of wireless links already established to other apparatuses. In FIG. 6, apparatus C 306 and apparatus 400 may be deemed an "other" apparatuses since they are not apparatuses that are a target of source apparatus A 302. The above mathematical relationship is represented in FIG. 6 by equation 600, which sets forth:

$$C_{other}(J_{new}, U_{other}) = \sum_{i \in U_{other}} \log_2(1 + SIR_i)$$

Cumulative performance $C_{other}$ in view of the effect of new wireless link $J_{new}$ on existing wireless links $U_{other}$ is equal to the summation of binary logarithm of 1+ the Signal-to-Interference Ratio (SIR) for each of the existing wireless links to the other apparatuses. In this scenario, the existing wireless links $U_{other}$ between other apparatuses see any newly established wireless links $J_{new}$ between source apparatus A 302 and target apparatus B 304 as interference only (e.g., no benefit to the other apparatuses is realized by initiating these new links), and thus, these links are not considered in the summation. This summation accounts for negative effects that may be experienced from initiating new links based on the signal strength of existing links between other apparatuses in that any interference created by new links reduces the SIR_i of the existing links, and thus, cumulative performance measure diminishes. If the new wireless link is orthogonal to a particular link of the "other" apparatuses, then naturally the SIR would remain unaffected (or would experience minimal effect). When this happens, a source apparatus may know that it is operating on a channel that is orthogonal (or nearly orthogonal) to existing links.

Cumulative measurement components, such as described with respect to FIGS. 5 and 6, may be considered together in order to form a relationship between environment 300, as it stands, and environment 300 after the initiation of proposed new wireless links. Initially, FIG. 7 discloses equation 700 that, in accordance with at least one embodiment of the present invention, describes these two states in environment 300 as follows:

$$C_{target}(J_{new}, U_{other}) + C_{other}(J_{new}, U_{other}) > C_{target}(U_{other}) + C_{other}(U_{other})$$

In this mathematical relationship, if the performance of proposed new wireless links accounting for interference that may be caused by any existing wireless links to target apparatuses, $C_{target}(J_{new}, U_{other})$, plus the performance of wireless links already existing between other apparatuses accounting for interference that may be caused by the proposed new wireless links, $C_{other}(J_{new}, U_{other})$, is greater than the performance of any wireless links already existing to target apparatuses accounting for interference that may be caused by wireless links already existing between other apparatuses, $C_{target}(U_{other})$, plus the performance of wireless links already existing between other apparatuses, the source apparatus may initiate the proposed wireless links in environment 300. This relationship may further be summarized, as disclosed in FIG. 7, to state that the proposed new wireless links may be initiated if the cumulative performance of wireless communication that is predicted to exist after the proposed links to target are initiated is greater than the current cumulative performance of wireless communication in environment 300.

There may also be other relationships that can be used when deciding whether or not to initiate new wireless links. For example, the left hand side in equation 700, such as set forth above, may not need to be strictly greater, but instead, new link may be established if:

$$C_{target}(J_{new}, U_{other}) + C_{other}(J_{new}, U_{other}) - C_{target}(U_{other}) - C_{other}(U_{other}) > th$$

where th is a threshold on performance difference. The coefficient th is typically non-negative, but may be slightly negative if, for example, access is prioritized for a user for any reason. Similarly, the criterion may be stated in fractional form reflecting that the capacity needs to increase by certain minimal percentage before access may be granted. Many possible methods may be employed for deciding on transmission opportunities, but in the various embodiments of the present invention, such as set forth herein, utilize the terms in the above equation, though the exact functional relationship is not relevant. Moreover, the performance measures need not be in the form given above, but may use in place of the above information-theoretic capacity measures throughput measures, or other utility measures, that do not decrease whenever the SIR increases.

IV. Implementation Example

Figure 8:
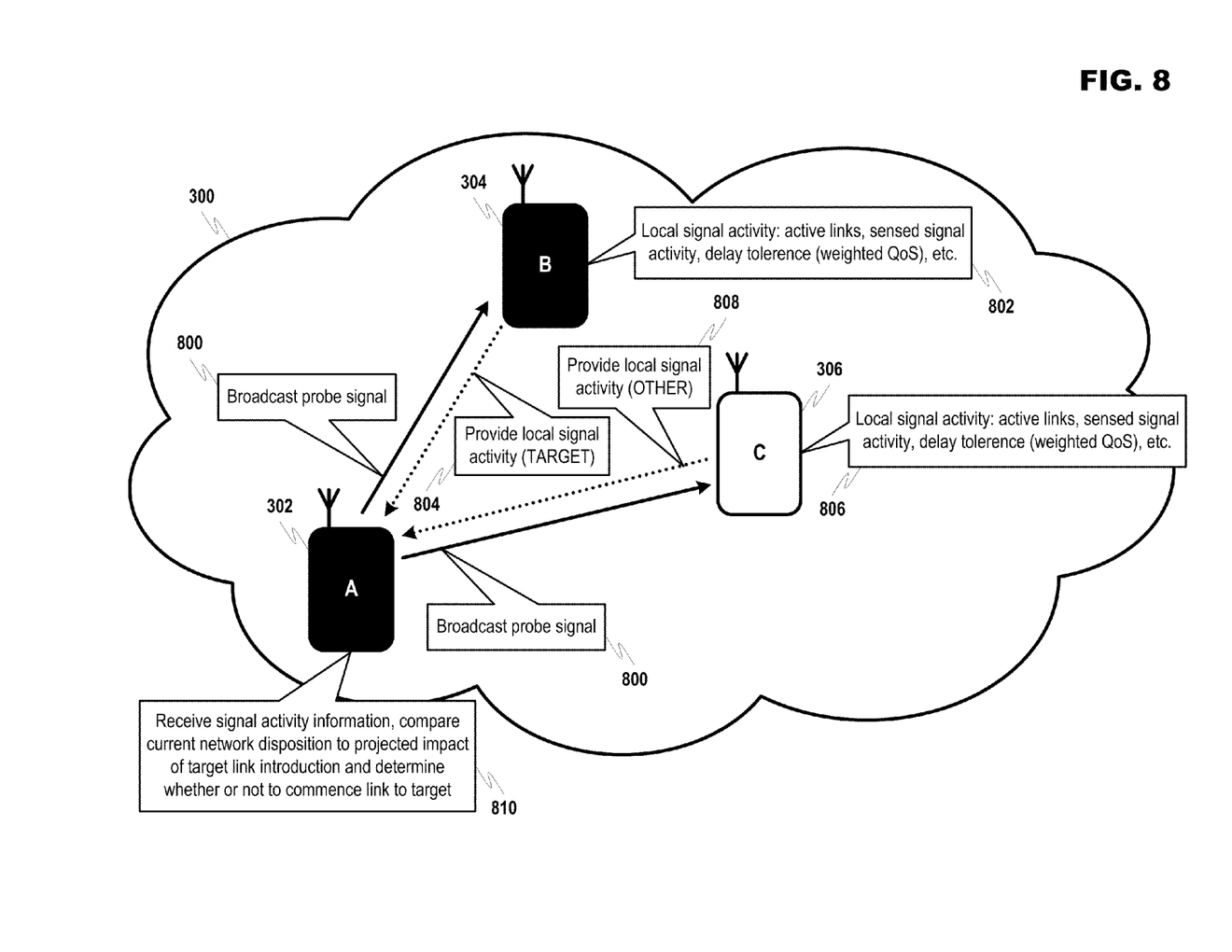
FIG. 8 discloses an example of apparatus interaction and information exchange in accordance with at least one embodiment of the present invention.

In accordance with at least one embodiment of the present invention, an example implementation with respect to example environment 300 is disclosed in FIG. 8. Initially source apparatus A 302 may broadcast probe signals 800. Probe signals 800 may be broadcast periodically during a dedicated commonly agreed probing slot or during a transmission slot (asymmetrically with other apparatuses). Apparatuses that receive probe signals may then generate local signal activity. For example, apparatus B 304 is a target device, and may generate local signal activity as shown at 802. Local signal activity may include, for example, the identification of active links (e.g., already existing links between apparatus B 304 and other apparatuses) and sensed signal activity in proximity to apparatus B 304. In accordance with at least one embodiment of the present invention, apparatus B 304 may also provide delay tolerance information (such as weighted QoS information) as part of local signal activity 802. Delay tolerance information may dictate that a particular apparatus has an increased level of delay tolerance, which may further indicate that the apparatus is lower priority than other apparatuses that are not as tolerant to delay. Increased delay tolerance may result in a lower QoS, which may be acceptable where the QoS required by apparatuses is weighted in order to provide additional resources to higher priority apparatuses.

After accumulating and/or computing local signal activity at 802, this information may be sent back to the source apparatus in a manner such as shown at 804. Other apparatuses that receive probes from apparatus A 302 may respond in the same manner. For example, other apparatus C 306 may accumulate and/or compute local signal activity at 806, and then transmit a response message at 808. Upon receiving example response messages 804 and 808, apparatus A 302 may utilize the local signal activity information contained within these messages in a variety of ways. Initially, apparatus A 302 may determine if the information was received from a target apparatus or another apparatus. This determination may, for example, be based on identification information provided in response messages 804 and 808. In particular, response message 804 may contain information indicating that it was sent from apparatus B 304. Apparatus B 304 is a target apparatus in the example of FIG. 8. Target apparatuses may be identified by specific apparatus identification, the type or class of the apparatus, the user associated with the apparatus, etc Likewise, identification information may also be derived from information sent in response 808. However, in this instance apparatus A 302 may determine that response 808 was sent from non-target apparatus C 306, and thus, this apparatus may be considered in the "other" category.

Classifying "target" apparatuses and "other apparatuses may become important at least when apparatus A 302 computes the aforementioned cumulative performance relationships. Initially, receiving responses from "target" apparatuses will indicate the number of new wireless links that are being proposed for initiation in environment 300. For example, if no responses are received from target apparatuses then no evaluation is necessary as no new wireless links will be implemented. In addition, the apparatus classification may help to determine where the signal activity information provided by an apparatus is inputted into the aforementioned equations. The source apparatus A 302 may then compare a cumulative performance measure for wireless communication in environment 300 that accounts for the initiation of any proposed new wireless links to the current cumulative performance measure for wireless communication in environment 300 at 810. If the predicted performance measure after link initiation is greater than the current performance measure, then the proposed links may be initiated between source apparatus A 302 and any target apparatuses, which in this example constitutes target apparatus B 304.

In accordance with various example implementations of the present invention, the information processing burden involved in performing the previously disclosed computations and/or comparisons may be handled completely by source apparatuses or may be shared between the responding apparatuses and the source apparatuses. For example, the information provided by the responding apparatuses may be partially or totally processed prior to inclusion in a response message. Partial processing may imply that at least some of the raw signal information accumulated by the apparatus in processed into another format prior to transmission. It may also be possible for some responding apparatuses to provide signal information to source apparatuses in a form that is directly usable in cumulative performance measure computation and evaluation. Further, the processing of raw signal information that takes place in each responding device may, in accordance with at least one embodiment of the present invention, vary depending on whether the particular responding apparatus is considered a target apparatus or an "other" apparatus. For example, other apparatuses may not need to provide as much signal information as target apparatuses in view of their limited role in any resulting new wireless link establishment.

Figure 9:
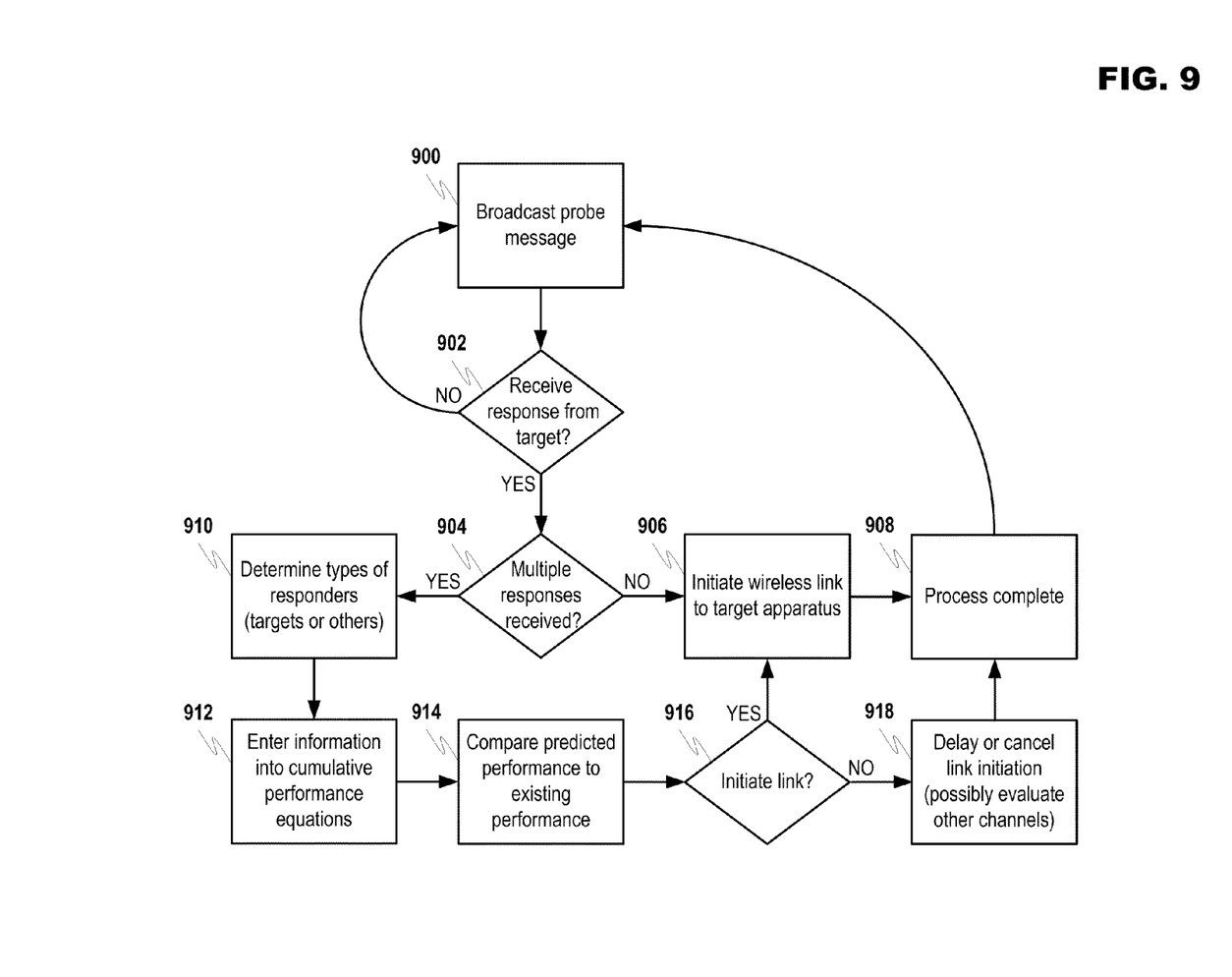
FIG. 9 discloses a flowchart for an example communication management process in accordance with at least one embodiment of the present invention.

A flowchart of an example communication process in accordance with at least one embodiment of the present invention is disclosed in FIG. 9. In step 900 a source apparatus may broadcast one or more probe messages. The source apparatus may continue to broadcast probe messages in step 900 until at least one response is received from a target apparatus in step 902. A determination may then be made in step 904 as to whether multiple response messages have been received. If only one response has been received in step 904, then in step 906 the source apparatus may initiate a link to the target apparatus in order to, for example, convey information desired by the target apparatus. The process may then be complete in step 908 and may return to step 900 where the source apparatus may again broadcast probe messages.

If multiple response messages are determined to have been received per step 904, then in step 910 the source apparatus may begin to evaluate signal information provided in the response messages. For example, in step 910 the source apparatus may use information received in the response messages to determine if the apparatus that corresponds to the response message is a target apparatus or an "other" apparatus. Based on the type of apparatus determined in step 910, the source apparatus may in step 912 utilize local signal information provided by each of the responding target or other apparatuses as inputs to cumulative performance measure relationships such as described previously herein. The results of these relationships may then be evaluated in step 914. For example, source apparatuses may determine if a predicted cumulative performance measure for wireless communication in the environment that takes into account the impact of proposed new wireless links is greater than a current cumulative performance measure for wireless communication in the environment. If the comparison of step 914 reveals that the performance of wireless communication in the environment will increase after initiating the proposed new links, then in step 916 the process may return to step 906 where the proposed wireless links may be initiated. However, if the source apparatus determines that the predicted wireless communication performance will decrease after the proposed new wireless links are initiated, then the process may proceed to step 918 where the new link initiation is delayed (e.g., until the environment is more suitable for link initiation) or canceled. Alternatively, in step 918 the source apparatus may also evaluate the possibility of access initiation in one or more other wireless channels (e.g., by changing center frequency or time-frequency slot, accordingly) to see if a better channel (e.g., time-frequency slot) is available, and may then utilize the wireless channel which is best in terms of selected performance measure. The process may terminate in step 908 and return to step 900 where source apparatuses may again transmit probe messages.

While various exemplary configurations of the present invention have been disclosed above, the present invention is not strictly limited to the previous embodiments.

For example, the present invention may include, in accordance with at least one example embodiment, an apparatus comprising means for transmitting a probe signal from an apparatus via wireless communication, means for receiving one or more signals in response to the probe signal, means for evaluating link information contained in the one or more response signals, and means for determining whether to initiate a new wireless link to a target apparatus based on the evaluation.

At least one other example embodiment of the present invention may include electronic signals that cause apparatuses to transmit a probe signal from an apparatus via wireless communication, receive one or more signals in response to the probe signal, evaluate link information contained in the one or more response signals, and determine whether to initiate a new wireless link to a target apparatus based on the evaluation.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed is:

1. A method, comprising:
transmitting a probe signal from an apparatus via wireless communication;
receiving one or more signals in response to the probe signal;
evaluating link information contained in the one or more response signals; and
determining whether to initiate a new wireless link to a target apparatus based on the evaluation,
wherein the link information evaluation comprises computing a first cumulative performance measure for existing wireless links based on the link information and computing a second cumulative performance measure for the existing wireless links and the new wireless link based on the link information and the projected impact of the new wireless link on the existing wireless links.

2. The method of claim 1, further comprising determining whether any of the one or more signals received in response to the probe signal corresponds to the target apparatus.

3. The method of claim 2, wherein the new wireless link is initiated if only one signal in response to the probe signal is received and the response signal corresponds to the target apparatus.

4. The method of claim 1, wherein the second cumulative performance measure comprises at least one performance component computed using the following equation:

$$C_{target}(J_{new}, U_{target}) = \sum_{i \in \{J_{new}, U_{target}\}} \log_2(1 + SIR_i).$$

5. The method of claim 1, wherein the second cumulative performance measure comprises at least one performance component, computed using the following equation:

$$C_{other}(J_{new}, U_{other}) = \sum_{i \in U_{other}} \log_2(1 + SIR_i).$$

6. The method of claim 1, wherein the new wireless link determination comprises initiating the new wireless link if the second cumulative performance measure is greater than the first cumulative performance measure.

7. The method of claim 6, wherein the determination is performed using the equation:

$$C_{target}(J_{new}, U_{other}) + C_{other}(J_{new}, U_{other}) > C_{target}(U_{other}) + C_{other}(U_{other}).$$

8. A computer program product comprising a non-transitory computer readable storage medium having computer executable program code stored thereon, the computer executable program code comprising:
   code configured to cause an apparatus to transmit a probe signal from an apparatus via wireless communication;
   code configured to cause the apparatus to receive one or more signals in response to the probe signal;
   code configured to cause the apparatus to evaluate link information contained in the one or more response signals; and
   code configured to cause the apparatus to determine whether to initiate a new wireless link to a target apparatus based on the evaluation,
   wherein the link information evaluation comprises computing a first cumulative performance measure for existing wireless links based on the link information and computing a second cumulative performance measure for the existing wireless links and the new wireless link based on the link information and the projected impact of the new wireless link on the existing wireless links.

9. The computer program product of claim 8, further comprising code configured to cause the apparatus to determine whether any of the one or more signals received in response to the probe signal corresponds to the target apparatus.

10. The computer program product of claim 9, wherein the new wireless link is initiated if only one signal in response to the probe signal is received and the response signal corresponds to the target apparatus.

11. The computer program product of claim 8, wherein the second cumulative performance measure comprises at least one performance component computed using the following equation:

$$C_{target}(J_{new}, U_{target}) = \sum_{i \in \{J_{new}, U_{target}\}} \log_2(1 + SIR_i).$$

12. The computer program product of claim 8, wherein the second cumulative performance measure comprises at least one performance component, computed using the following equation:

$$C_{other}(J_{new}, U_{other}) = \sum_{i \in U_{other}} \log_2(1 + SIR_i).$$

13. The computer program product of claim 8, wherein the new wireless link determination comprises initiating the new wireless link if the second cumulative performance measure is greater than the first cumulative performance measure.

14. The computer program product of claim 13, wherein the determination is performed using the equation:

$$C_{target}(J_{new}, U_{other}) + C_{other}(J_{new}, U_{other}) > C_{target}(U_{other}) + C_{other}(U_{other}).$$

15. An apparatus, comprising:
   at least one processor; and
   at least one memory including executable instructions, the at least one memory and the executable instructions being configured to, in cooperation with the at least one processor, cause the apparatus to perform at least the following:
   transmit a probe signal via wireless communication;
   receive one or more signals in response to the probe signal;
   evaluate link information contained in the one or more response signals; and
   determine whether to initiate a new wireless link to a target apparatus based on the evaluation,
   wherein the link information evaluation comprises computing a first cumulative performance measure for existing wireless links based on the link information and computing a second cumulative performance measure for the existing wireless links and the new wireless link based on the link information and the projected impact of the new wireless link on the existing wireless links.

16. The apparatus of claim 15, wherein the at least one memory and the executable instructions are further configured to, in cooperation with the at least one processor, cause the apparatus to determine whether any of the one or more signals received in response to the probe signal corresponds to the target apparatus.

17. The apparatus of claim 16, wherein the new wireless link is initiated if only one signal in response to the probe signal is received and the response signal corresponds to the target apparatus.

18. The apparatus of claim 15, wherein the second cumulative performance measure comprises at least one performance component computed using the following equation:

$$C_{target}(J_{new}, U_{target}) = \sum_{i \in \{J_{new}, U_{target}\}} \log_2(1 + SIR_i).$$

19. The apparatus of claim 15, wherein the second cumulative performance measure comprises at least one performance component, computed using the following equation:

$$C_{other}(J_{new}, U_{other}) = \sum_{i \in U_{other}} \log_2(1 + SIR_i).$$

20. The apparatus of claim 15, wherein the new wireless link determination comprises initiating the new wireless link if the second cumulative performance measure is greater than the first cumulative performance measure.

21. The apparatus of claim 20, wherein the determination is performed using the equation:

$$C_{target}(J_{new}, U_{other}) + C_{other}(J_{new}, U_{other}) > C_{target}(U_{other}) + C_{other}(U_{other}).$$

* * * * *